US009753695B2

United States Patent
Mortensen et al.

(10) Patent No.: US 9,753,695 B2
(45) Date of Patent: Sep. 5, 2017

(54) DATAPATH CIRCUIT FOR DIGITAL SIGNAL PROCESSORS

(71) Applicant: Analog Devices Global, Hamilton (BM)

(72) Inventors: Mikael M. Mortensen, Kgs. Lyngby (DK); Jeffrey G. Bernstein, Middleton, MA (US)

(73) Assignee: Analog Devices Global, Hamilton (BM)

( * ) Notice: Subject to any disclaimer, the term of this patent is extended or adjusted under 35 U.S.C. 154(b) by 284 days.

(21) Appl. No.: 14/010,946

(22) Filed: Aug. 27, 2013

(65) Prior Publication Data

US 2014/0067889 A1    Mar. 6, 2014

Related U.S. Application Data

(60) Provisional application No. 61/696,619, filed on Sep. 4, 2012.

(51) Int. Cl.
*G06F 7/38* (2006.01)
*G06F 7/60* (2006.01)
(Continued)

(52) U.S. Cl.
CPC ............... *G06F 7/60* (2013.01); *G06F 7/57* (2013.01); *G06F 1/035* (2013.01); *G06F 2101/08* (2013.01); *G06F 2101/10* (2013.01)

(58) Field of Classification Search
CPC ..................................... G06F 7/60; G06F 7/57
(Continued)

(56) References Cited

U.S. PATENT DOCUMENTS 5,796,645 A    8/1998    Peh et al.
6,611,856 B1    8/2003    Liao et al.
(Continued)

FOREIGN PATENT DOCUMENTS

CN    102257473 A    11/2011

OTHER PUBLICATIONS

Florent De Dinechin et al., "Floating-point exponential functions for DSP-enabled FPGAs", LIP research report RR2010-23, Jul. 27, 2010, 8 pages. Print ISBN: 978-1-4244-8980.
(Continued)

*Primary Examiner* — Tan V. Mai
(74) *Attorney, Agent, or Firm* — Schwegman Lundberg & Woessner, P.A.

(57) ABSTRACT

A datapath circuit may include a digital multiply and accumulate circuit (MAC) and a digital hardware calculator for parallel computation. The digital hardware calculator and the MAC may be coupled to an input memory element for receipt of input operands. The MAC may include a digital multiplier structure with partial product generators coupled to an adder to multiply a first and second input operands and generate a multiplication result. The digital hardware calculator may include a first look-up table coupled between a calculator input and a calculator output register. The first look-up table may include table entry values mapped to corresponding math function results in accordance with a first predetermined mathematical function. The digital hardware calculator may be configured to calculate, based on the first look-up table, a computationally hard mathematical function such as a logarithm function, an exponential function, a division function and a square root function.

20 Claims, 2 Drawing Sheets

(51) Int. Cl.
*G06F 7/57* (2006.01)
*G06F 1/035* (2006.01)

(58) Field of Classification Search
USPC .......................................................... 708/523
See application file for complete search history.

(56) References Cited

U.S. PATENT DOCUMENTS

| | | |
|---|---|---|
| 6,950,841 B2 | 9/2005 | Challa et al. |
| 7,284,027 B2 | 10/2007 | Jennings, III et al. |
| 7,353,008 B2 | 4/2008 | Karlsson |
| 7,366,745 B1 | 4/2008 | Oberman et al. |
| 7,539,717 B2 | 5/2009 | Hussain |
| 7,617,268 B2 | 11/2009 | Jennings et al. |
| 7,640,285 B1 * | 12/2009 | Oberman et al. ............. 708/523 |
| 7,711,764 B2 | 5/2010 | Dent |
| 7,982,496 B1 * | 7/2011 | Young ................ H03K 19/1733 326/38 |
| 2008/0071847 A1 * | 3/2008 | Cho ...................... H04L 27/263 708/404 |
| 2009/0094303 A1 | 4/2009 | Katayama |
| 2010/0023569 A1 * | 1/2010 | Shiao ...................... G06F 7/491 708/230 |
| 2011/0099335 A1 | 4/2011 | Scott et al. |
| 2011/0264719 A1 | 10/2011 | Mortensen |

OTHER PUBLICATIONS

"Chinese Application Serial No. 201310396061.X, Office Action mailed Mar. 8, 2016", (w/ English Abstract), 15 pgs.

Cong, Jason, et al., "Flow Map: An Optimal Technology Mapping Algorithm for Delay Optimization in Lookup-Table Based FPGA Designs", IEEE Transactions on a Computer-Added Design of Integrated Circuits and Systems, vol. 13, No. 1, (Jan. 1, 1994), 12 pgs.

* cited by examiner

DATAPATH CIRCUIT FOR DIGITAL SIGNAL PROCESSORS

The present invention relates to a datapath circuit for a Digital Signal Processor. The datapath circuit comprises a digital multiply and accumulate circuit (MAC structure) and a digital hardware calculator configured for parallel computation. The digital hardware calculator and the MAC are both coupled to an input memory element for receipt of first and second input operands. The MAC may comprises a conventional digital multiplier structure with a plurality of partial product generators coupled to an adder structure to multiply the first and second input operands and generate a multiplication result. The digital hardware calculator comprises a first look-up table operatively coupled between a calculator input and a calculator output register. The first look-up table comprises a plurality of table entry values mapped to a plurality of corresponding math function results in accordance with a first predetermined mathematical function. The digital hardware calculator may advantageously be configured to calculate, based on the first look-up table, a computationally hard mathematical function such as a logarithm function, an exponential function, a division function and a square root function.

BACKGROUND OF THE INVENTION

Digital multipliers are in wide-spread use in Digital Signal Processors (DSPs) for rapid multiplication of binary numbers. Many fundamental DSP algorithms such as FIR filters, IIR filters, convolution and Fast Fourier transform (FFT) depend heavily on multiply-accumulate performance of the DSP rendering the digital multiplier a vital component of the DSP. The digital multiplier is typically accompanied by an adder to form a fast multiply-accumulate (so-called MAC) computational structure. The binary numbers can be represented in various binary number formats such as two's complement, signed magnitude etc. The binary numbers may be represented in fixed-point format or floating point format. The number of bits used to represent each of the N-bit multiplicand (Y), i.e. N, and the M-bit multiplier (X), i.e. M, can vary widely depending on format and requirements of a particular application. The number of bits used for representing each of the N-bit multiplicand and M-bit multiplier typically lies between 8 and 56. These traditional MAC structures are well-adapted to provide fast multiplication and addition of input operands or variables of the above-mentioned fundamental DSP algorithms.

However, a significant number of signal processing algorithms require base math functions which are computationally hard, examples of these are logarithms, exponents, dividers and square roots. These computationally hard functions share the common feature of being difficult to map to binary math, e.g. logarithm functions, or that they possess a non-deterministic property, e.g. division operations. In this context, non-deterministic means that it is highly difficult or impractical to predict a resulting mathematical sequence in advance. This fact leads to arithmetic circuit designs that have to search for a correct solution. As example one can compare the predictability of the mathematical sequences of a digital multiplier and a digital divider. In the design of traditional signal processing algorithms and programmable digital signal processors rapid and efficient calculation of these computationally hard mathematical functions has largely gone unnoticed. The approach has been to solve these computationally hard mathematical functions by software routines exploiting the traditional MAC structure of the programmable DSP or, in the alternative, by building a customized digital state machine or customized data path exclusively adapted to compute a specific type of hard mathematical function. This specific math function could be a logarithm.

However, a DSP build around such a customized digital state machine or customized data path lacks flexibility to execute other types of computationally hard mathematical functions and the associated DSP algorithms in a rapid and energy efficient manner. Traditional MAC structures of programmable DSPs can be adapted to execute a wide-range of DSP algorithms by suitably configured DSP software. However, the traditional MAC structure is unfortunately slow and power inefficient when it comes to executing the above-mentioned computationally hard mathematical functions. This is because the traditional MAC structure is optimized to perform multiplication, addition and subtraction operation and hence by design ill-suited to compute other types of mathematical functions. Therefore, a large number of MAC cycles are typically consumed by program routines computing the hard mathematical functions. This imposes a high computational load on the traditional MAC structure harming computational performance of the programmable DSP by blocking or delaying computations of other mathematical functions forming part of the DSP algorithm(s) in question.

Hence, there is a need for a datapath circuit which comprises a traditional digital multiply and accumulate circuit (MAC), for performing efficient and rapid multiplication, addition and subtraction operations, and a digital hardware calculator or math accelerator for efficient and rapid computation of the above-mentioned computationally hard mathematical functions. It would even more attractive if the (MAC) and digital hardware calculator were able to operating parellelly to improve computation throughput of the datapath circuit. Hence, the hardware architecture or design of the MAC and the digital hardware calculator can be optimized for the differing needs of different types of mathematical functions to be executed.

U.S. Pat. No. 7,284,027 relates to methods and circuit cells performing high-speed arithmetic computations on fixed-point or floating-point numbers for real-time DSP applications. The disclosure relates to a customized multiplier architecture/topology for multiplication of fixed or floating-point complex numbers in connection with rapid FFT computations. The complex multiplier structure is based on log-domain computations to multiply complex input numbers by logarithmic add operations and subsequently apply exponentiation to return with a multiplication result in the linear domain.

U.S. Pat. No. 7,539,717 discloses methods and hardware circuit blocks using a table-based Taylor series approximation to compute logarithms of floating-point numbers in DSP applications. A number of dedicated hardware blocks, which perform certain preprocessing steps on a floating point input operand, are coupled to a floating-point FMAD which performs a final computation of a logarithm of the floating point input operand based on preprocessed compressed values. The dedicated hardware blocks comprise a first lookup table and a second lookup table storing full-precision variable and compressed variable values, respectively, associated with a logarithm function.

SUMMARY OF INVENTION

A first aspect of the invention relates to a datapath circuit for a Digital Signal Processor, such as a software programmable Digital Signal Processor controlled by executable program instructions. The datapath circuit comprises an input memory element, e.g. an input register, for storage of a first and a second input operand. The datapath circuit comprises furthermore a digital multiply and accumulate circuit and a digital hardware calculator configured for parallel computation. The digital multiply and accumulate circuit comprising:

a first input and a second input connected both to the input memory element for receipt of the first and second input operands, respectively, a plurality of partial product generators, configured for generation of a plurality of partial products of the first or second input operands, an adder structure configured to receive and combine the plurality of partial products to produce a multiplication result, an arithmetic logic unit configured for receipt of the multiplication result and addition of a first variable thereto to compute an accumulated multiplication result, a first accumulator coupled to the arithmetic logic unit and configured for receipt and manipulation of the accumulated multiplication result. The digital hardware calculator comprises a calculator input connected to one of the first and second input operands and a calculator output register for storage of computed calculator results. A first look-up table of the digital hardware calculator is operatively coupled between the calculator input and the calculator output register. The first look-up table comprises a plurality of table entry values mapped to a plurality of corresponding math function results in accordance with a first predetermined mathematical function.

The inclusion of the digital hardware calculator in the present datapath circuit provides numerous benefits to the datapath circuit. These are particularly pronounced if the digital hardware calculator is configured to calculate one of more of the previously discussed computationally hard mathematical functions such as a logarithm function, an exponent function, a division function and a square root function. These arithmetic functions are either difficult to map to binary math circuitry, e.g. logarithm functions, or non-deterministic, e.g. division functions. However, these computationally hard mathematical functions can be mapped to a look-up table in a straight forward manner with a desired precision. By choosing the number of table entry values or table size a desired level of precision can be reached. Furthermore, the precision can be improved by applying well-known table interpolation schemes between the relevant math function results. Hence, the provision of the parellelly operating digital multiply and accumulate circuit (MAC structure) and digital hardware calculator allows math computations of a DSP algorithm to be split in separate portions or program routines which are simultaneously executed on the optimal computational hardware of the datapath circuit for the specific type of arithmetic operations in question. In this manner, the present datapath circuit is capable of executing traditional multiply-accumulate operations for FIR-filters, IIR-filters etc. on the MAC structure which is efficient for these types of computations. Simultaneously, mathematical functions like the previously discussed logarithms, divisions, exponents, square roots etc. can be executed efficiently on an appropriately configured digital hardware calculator. This split of the mathematical functions of a particular DSP algorithm between different computational hardware resources of the datapath circuit leads to considerable power savings and faster execution of numerous DSP algorithms that utilizes a mix of multiplication, additions and subtraction operations and the above-discussed hard mathematical functions. Hence, the digital hardware calculator may be adapted to support efficient computation of an entire class of highly useful DSP algorithms based of Bayesian, or probabilistic computations. This class of useful DSP algorithms comprises Hidden Markov Models (HMM) which are often based on the Viterbi algorithm which in turn relies heavily on computations of logarithmic functions.

Furthermore, by maintaining the traditional MAC structure in the present datapath circuit, re-use of existing DSP hardware building blocks, existing executable DSP program routines and existing programming models/structure is facilitated. The traditional MAC structure is highly sophisticated digital circuit building block or structure which provides rapid multiplication and addition operations with small die area consumption, dense circuit layout and low power consumption based on decades of R&D with accompanying architectural refinements. At the same time, new DSP software can exploit the advantages of present datapath architecture by directing the computation of the computationally hard mathematical functions to the digital hardware calculator so as to improve computational throughput or performance and lower power consumption of the datapath circuit. The split of arithmetic operations between the MAC structure and digital hardware calculator can for a specific DSP algorithm be performed by a suitably configured compiler during generation of the executable code or program routines that implements the DSP algorithm(s).

Generally, the first input operand may comprise an N-bit multiplicand and the second input operand may comprise an M-bit multiplier where each of M and N represents a positive integer number which is the respective word lengths of the first and second input operands. The values of N and M may be the same or they may differ. The value of each of N and M may for example lie between 8 and 64 bits. The digital multiplier preferably comprises a coding scheme to reduce the number of partial product generators. According to such embodiments, the plurality of partial product generators are adapted to select respective partial products of the N-bit multiplicand, where each partial product is selected from a set of partial product results computed from the N-bit multiplicand in dependence of a predetermined set of bits of the M-bit multiplier in accordance with a predetermined coding scheme, such as Booth coding. The skilled person will understand that different radixes of Booth coding may be applied depending on the size and complexity of the digital multiplier such as a Booth coding scheme selected from a group of {radix-4, radix-8, radix-16, radix-32, radix-64, radix-128} Booth coding.

Binary numbers, such as the first and second input operands, are preferably represented in the present datapath circuit in a common binary number format such as a format selected from a group of {two's complement, signed magnitude, redundant binary signed digit, carry save}.

The first look-up table may possess a 2-dimensional structure in some embodiments of the invention, i.e. mapping each single table entry value to a single corresponding math function result. However, the first look-up table may possess an N-dimensional structure in other embodiments wherein N is a positive integer larger than 2. In the latter embodiments, the first look-up table comprises N-dimensions mapping respective N−1 pluralities of table entry values to the corresponding match function results. This is highly useful for computation of numerous arithmetic operations such as division where the dividend or numerator may be the first input operand and the divisor or denominator the second input operand. The look-up table mapping such a division function is formed by a 3-dimensional table wherein each pair of input operands is mapped to a single corresponding math function result in accordance with the division operation.

In another useful embodiment, the digital hardware calculator comprises an interpolator for table interpolation. The interpolator is configured for reading first and second math function results from the first look-up table and applying an interpolating operation to the first and second math function results to generate an interpolated mathematical function result. The interpolator may be applied to fill gaps in the table entries of the first look-up table or generally improve the accuracy of the math function result if the value of the relevant input operand, or other variable, fails to exactly match any of the table entry values. The skilled person will understand that different types of interpolation operations or schemes may be applied by the interpolator such as spline interpolation or polynomial interpolation including linear interpolation (which is a special case of polynomial interpolation). Likewise, the interpolation function may comprise additional math function results than the above-mentioned first and second math function results depending on the complexity of the first predetermined mathematical function and accuracy requirements of any particular application.

Different types of memory elements may be utilized to store the respective values of the plurality of table entries and the plurality of the math functions results, i.e. table data, of the first look-up table depending on the application and memory options available in a semiconductor process used for fabrication of the datapath circuit. In one embodiment, the look-up table may be fabricated as mask programmed or synthesizable ROM which stores the table data. Implementation of the look-up table in ROM generally consumes a minimum of semiconductor die area and leads to a low power consumption in connection with read operations in the look-up table. On the other hand, the predetermined mathematical function mapped by the first look-up table must be selected at the time of design of the datapath circuit and remains fixed thereafter which limits flexibility in some situations.

In an alternative and likewise advantageous embodiment, the look-up table comprises readable and writable memory elements storing the table data content. In this embodiment, the readable and writable memory preferably comprises memory elements selected from a group of {RAM, EPROM, EEPROM, flash memory, data register}. The skilled person will understand that the look-up table may comprise combinations of the above listed types of readable and writable memory elements.

The use of readable and writable memory elements for storage of the table data allows the first predetermined mathematical function to be changed at run-time in connection with generation of the executable program routines or code for the DSP device which includes the present datapath circuit. The predetermined mathematical function may accordingly be selected by a code developer or programmer assisted by a suitable programming tool or environment such as VisualDSP++® or SigmaStudio™ depending on the nature of the programmed DSP algorithm(s). Hence, for DSP algorithms that include a large number of logarithmic function computations, the look-up table may be configured to map the relevant logarithmic function such as ln(x), log 10(x), log 2(x) etc. The look-up table of same datapath circuit may, however, be configured to map a completely different predetermined mathematical function such as a square root or division function when executing other types of DSP algorithms in different DSP applications. Hence, by choosing the readable and writable memory type for storage of the first look-up table the digital hardware calculator provides a highly flexible math computational engine or co-processor. This property allows the same datapath circuit to speed-up math computations in numerous types DSP algorithms by simply adapting the table data content of the first look-up table to the predetermined mathematical function in question.

In another advantageous embodiment of the present datapath circuit, a multiplexer is configured to selectively transmitting one of the mathematical function result and the first or second input operands to the arithmetic logic unit of the MAC structure as the first variable. The multiplexer serves to tightly integrating the digital hardware calculator with the MAC structure such that math function results from computationally hard functions can be injected directly into the arithmetic logic unit without any time delays or need for temporary storage, register or memory move operations etc. The multiplexer preferably has a first input coupled to the input memory element and a second input coupled to an output register of digital hardware calculator holding the mathematical function result. In this manner, the source of the first variable can be selected in a flexible manner by appropriately controlling logic states of a select input of the multiplexer.

The skilled person will understand that the digital hardware calculator may comprise various pre-processing functions inserted in front of the first look-up table for pre-processing the first and second input operands or other input variables. Likewise, post-processing functions, such as the previously discussed interpolator, may be inserted after the first look-up table to further process the generated math function result(s) before storage of a final math result in the calculator output register. In one embodiment, a compressor function is inserted between the input memory element and the first look-up table. The compressor function is configured to mapping a numerical range of compressor input values into a smaller numerical range of compressor output values. A multiplexer is additionally configured to selectively transmit, to the input of the look-up table, one of the first and second input operands and corresponding compressed values of the first and second input operands. The compressor function may be utilized to reduce a numerical range of the first and/or second input operands, or other input variables, before table look-up which may serve to reduce a size of the first look-up table.

The present datapath circuit may in some embodiments comprise one or more further look-up tables in addition to the first look-up table. These further look-up tables are preferably adapted to map respective further computationally hard mathematical functions. This allows higher order mathematical functions, relative to the previously discussed base functions like the above discussed logarithms, divisions, exponents, square roots, to be computed by the digital hardware calculator. According one such embodiment, the digital hardware calculator comprises a second look-up table operatively coupled between an output of the first look-up table and the calculator output register. The second look-up table comprises a plurality of table entry values mapped to a plurality of corresponding math function results in accordance with a second predetermined mathematical function. This latter embodiment can for example be configured to compute higher order mathematical functions like:

a negative Jacobian log function, min*(x, y)=
    Min(x, y)−ln(1+e$^{(-|x-y|)}$) and a max-log function, max*=max($x$, $y$)+ ln(1+$e^{(-|x-y|)}$);

wherein x may be equal to the first input operand and y equal to the second input operand. The first predetermined mathematical function may comprise an exponential function for look-up table based computation of 1+$e^{(-|x-y|)}$; The second predetermined mathematical function may comprise a natural logarithmic function such that the natural logarithm is taken of the math function result provided at the output of the first look-up table.

The skilled person will appreciate that the term 'parallel computation', as applied to the respective arithmetic computations of the digital multiply and accumulate circuit and the digital hardware calculator, means that these arithmetic computations may be executed simultaneously instead of sequentially. Alternatively stated, the term 'parallel computation' means that the computational cycles executed by the digital multiply and accumulate circuit at least partly overlaps in time with computational cycles executed by the digital hardware calculator when the digital multiply and accumulate circuit and the digital hardware calculator are both operational. Hence, the datapath circuit is configured such that mathematical function operations the digital hardware calculator and the digital multiply and accumulate circuit may be executed fully independently. The simultaneous computation capability of the MAC structure and the digital hardware calculator does not mean that the respective computations have the same cycle time or are placed in a common pipeline stage of the datapath circuit. The digital hardware calculator may for example have a longer cycle time than the digital multiply and accumulate circuit such that a plurality of MAC operations, delivering respective accumulated multiplication results, can be performed simultaneously with a single cycle of the digital hardware calculator or vice versa. Alternatively, a suitable number of stall cycles may be inserted in the pipeline of the MAC structure until the digital hardware calculator has completed its computational cycle by delivering the calculator result.

As mentioned above each of the first and second input operands, the plurality of table entry values, the plurality of corresponding math function results, and preferably all other variables of the datapath circuit, are preferably represented in a common binary number format selected from a group of {two's complement, signed magnitude, redundant binary signed digit, carry save}.

A second aspect of the invention relates to a Digital Signal Processor circuit assembly comprising:
a Digital Signal Processor comprising:
a datapath circuit according any of the above-described embodiments thereof,
a readable and writable data memory space for storing the first look-up table;
a non-volatile memory storing:
a set of executable program instructions of a digital signal processing algorithm for execution on the Digital Signal Processor,
look-up table data comprising the plurality of table entry values and the plurality of corresponding math function results.

The non-volatile memory may be integrated on a common semiconductor substrate with the Digital Signal Processor. Alternatively, the non-volatile memory may comprise a separate integrated circuit for example a serial EEPROM or flash memory. The serial EEPROM or flash memory and the Digital Signal Processor may be mounted on a shared carrier such as a printed circuit board and coupled for exchange of data through a shared data bus and respective data ports or interfaces.

According to a third aspect of the invention, there is provided a method of generating the look-up table data content for the above-mentioned Digital Signal Processor circuit assembly, the method comprising steps of:
selecting a digital signal processing algorithm for the Digital Signal Processor,
selecting a mathematical function of the digital signal processing algorithm to be tabulated,
selecting minimum, maximum table entry values and table step size values of the first look-up table,
generating the look-up table data content by computing the plurality of table entry values and the plurality of corresponding math function results based on the selected mathematical function the minimum, maximum table entry values and table step size values,
writing the look-up table data content to an address space of the non-volatile memory.

According to the present methodology, the look-up table is stored in the previously discussed readable and writable memory type of the DSP which preferably is arranged in a data memory of the DSP. The table data content may be selected or defined in connection with development of DSP source code in an appropriate PC or workstation based software tool or code development environment. The software tool may for example be adapted to compute appropriate table values based on programmer or user specifications such as table size, minimum and maximum table entry values, binary number format etc. The table entry values and the accompanying math function results may be computed by the software tool exploiting computation resources of the PC or workstation and subsequently written to, and stored in, the address space of the non-volatile memory. The table entry values and the accompanying math function results may be transmitted through a programming port or interface from the PC or workstation to the Digital Signal Processor (DSP). At the initialization, or power-on, of the DSP circuit after programming, the table data content may be read into or transferred to the readable and writable memory space of the DSP such as a data RAM space or data register file during execution of the DSP algorithm(s) to allow fast access to the table data content during execution of the digital signal processing algorithm on the DSP.

BRIEF DESCRIPTION OF THE DRAWINGS

A preferred embodiment of the invention will be described in more detail in connection with the append drawings in which.

DESCRIPTION OF PREFERRED EMBODIMENTS

Figure 1:
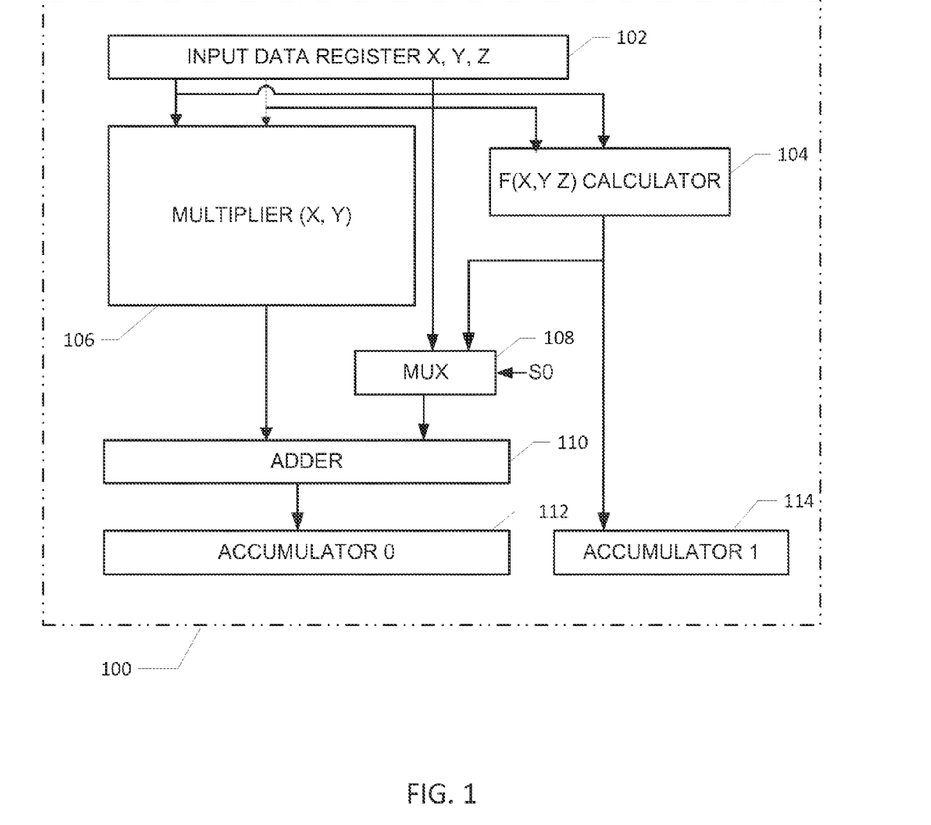
FIG. 1 is a schematic drawing of a datapath circuit for a Digital Signal Processor in accordance with a first embodiment of the present invention.

FIG. 1 is a schematic drawing of a datapath circuit 100 that is particularly well-suited for integration in a Digital Signal Processor where common real-time signal processing algorithms require rapid computation of complex mathematical functions. The skilled person will however appreciate that the present datapath circuit 100 also can be integrated in traditional microprocessor designs for example as a mathematical hardware accelerator or co-processor.

The datapath circuit 100 comprises an input memory element or block 102, e.g. an input data register or a RAM location, which is configured for storage of at least a first and a second input operand. The first and second input operands may be represented in a fixed point or a floating point format and the datapath circuit adapted to each type of numerical format. The skilled person will appreciate that the input memory element 120 may be configured to store one or more additional input operands. The datapath circuit 100 comprises a digital multiply and accumulate circuit (MAC) and a digital hardware calculator 104 that are both configured for receipt of the first and second input operands and execution of parallel computations on these operands. The MAC structure comprises a traditional digital multiplier 106 which comprises a plurality of partial product generators and a suitable adder structure configured for multiplication of the first and second input operands held in the input memory element 120 and providing a multiplication result. The skilled person will understand that the digital multiplier may be of largely identical design or structure to anyone of the numerous types of traditional digital multiplier architectures. In one embodiment the adder structure may comprise carry-propagate adders or carry-save adders. The digital multiplier may include Booth-encoding of the partial product generators for example radix-4 or radix-8 Booth encoding. The size of the traditional digital multiplier 106 may vary considerably as the size depends on the selected word lengths of the first and second input operands. These word lengths can vary considerably dependent on the requirement of a specific application and may be identical or different. The word lengths of each of the first and second input operands may for example lie between 8 and 64 bits. The first and second input operands are preferably represented in a common binary number format such as a format selected from a group of {two's complement, signed magnitude, redundant binary signed digit, carry save}.

The multiplication result produced by the digital multiplier 106 is transmitted to an arithmetic logic unit 110, through a suitable internal data bus, which is configured to add the multiplication result to a first variable. The first variable is provided at a multiplexer output of multiplexer 108. The output of the arithmetic logic unit 110 is an accumulated multiplication result which is conveyed to an input of a first accumulator 112 coupled to the arithmetic logic unit as illustrated. The first accumulator 112 is configured to receive, temporary store and manipulate the accumulated multiplication result, which often represents an intermediate result of a particular DSP algorithm under execution. The manipulation of the accumulated multiplication result may involve numerous types of arithmetic operations such as truncation, rounding, left or right adjusting etc. The skilled person will appreciate that the digital multiplier 106 and the arithmetic logic unit 110 preferably are designed with a traditional MAC structure. The digital multiplier 106 may be configured to multiply an N-bit multiplicand, i.e. the first input operand, with an M-bit multiplier, i.e. the second input operand. The digital multiplier 106 preferably comprise a plurality of partial product generators being adapted to select respective partial products of the N-bit multiplicand, where each partial product is selected from a set of partial product results computed from the N-bit multiplicand in dependence of a predetermined set of bits of the M-bit multiplier in accordance with a predetermined coding scheme, such as Booth coding. The traditional MAC structure beneficially supports re-use of existing DSP hardware building blocks, DSP code and programming models/structure. The traditional structure of the present MAC structure thus provides backwards compatibility allowing fast porting of existing field-proven DSP software and algorithms and optimal execution thereof.

The multiplexer 108 is tightly integrated with the MAC structure in an advantageous manner such that the source of the first variable can be selected in a flexible manner by controlling the logic state of a select input S0 of the multiplexer 108. Depending on the logic state of S0 either the mathematical function result, computed by the digital hardware calculator 104, or one of the first and second input operands held in the input memory element 102, is transmitted to the arithmetic logic unit 110 via the multiplexer output of multiplexer 108. Likewise, any other relevant operand or variable held in the input memory element 102 may be transmitted to the arithmetic logic unit 110. Hence, in one state of S0, the MAC structure is capable of rapidly computing:

$F=(x*y)+z$; where z represents a third input operand in a first logic state of the select input S0. In the second, opposite, logic state of S0 the digital hardware calculator 104 is configured to rapidly compute functions like:

$F=(x*y)+\ln(z)$ or $F=(x*y)+\ln(x)$ or $F=(x*y)+e(z)$ or $F=\int \cos x \, dx = \sin x + C$ or $F=\int \tan x \, dx = -\ln|\cos x| + C$ In other embodiments, digital hardware calculator 104 is configured to compute probability functions based on the lookup table 210. The probability functions may comprise a binomial function.

The digital hardware calculator 104 preferably comprises one or more look-up table(s) operatively coupled between a calculator input and a calculator output. The calculator input is preferably coupled to at least the first and second input operands but may be coupled to further input operands or additional data registers for receipt of the relevant input operands or variables. The output of the digital hardware calculator 104 is coupled to a second accumulator 114 for manipulation, if desired, of the computed calculator results from the digital hardware calculator 104. The digital hardware calculator 104 is configured to perform certain arithmetic operations on input operands in order to efficiently compute one or more computationally hard mathematical functions such as a logarithm function, an exponent function, a division function and a square root function based on one or more look-up tables as described in further detail below.

Figure 2:
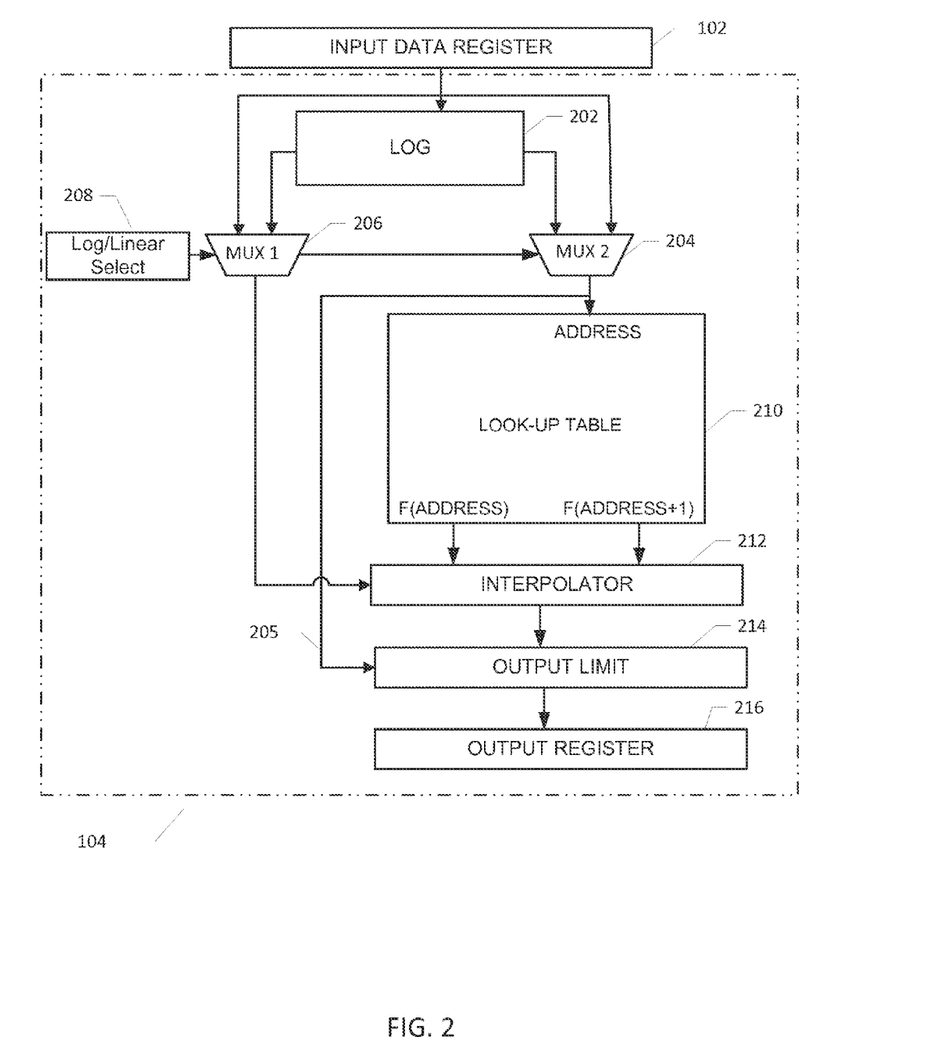
FIG. 2 is a schematic drawing of a digital hardware calculator of the datapath circuit depicted on FIG. 1.

FIG. 2 is a schematic drawing of the digital hardware calculator 104 of the datapath circuit in accordance with a preferred embodiment. The digital hardware calculator 104 receives input operands from the input memory element 102 and may either transmit the input operand unprocessed to an entry of a look-up table 210 through multiplexer 204, MUX-2. In the alternative, the input operand may be firstly transmitted to an optional compressor function 202 and the processed, or compressed, value of the input operand transmitted to the entry of the look-up table 210. A logic select signal controlled by a Log/Linear select function 208 is applied to a select input of the multiplexer 204 and thereby controls in which of the above formats the input operand is transmitted to the loop-up table 210. The compressor function maps a numerical range of the input operand, for example +32768 to −32767 for signed 16-bit integer representation, into a smaller numerical range of compressor output values. This reduction of numerical range of the input operands or variables can increase accuracy of the math function results outputted by the look-up table representing the predetermined mathematical function. Or the compression operation may conversely reduce the required number of table entry values and table size for a given accuracy of the outputted math function results as e.g. a log compressor function will result in a high number of table entries between 0.0 and 1.0 with a decreasing number of table entries for larger table entry values. This feature allows mapping of arithmetical functions like the square root function to a smaller look-up table than would have been required by a linear step between the table entries. The size of the look-up table 210 will naturally vary depending on characteristics of the predetermined mathematical function, the numerical range of the input operands and accuracy requirements imposed by a particular DSP algorithm. In a number of exemplary 2-dimensional table embodiments, the look-up table comprises between 256 and 4096 separate table entries, such as between 512 and 1024 entries, and a corresponding number of math function results.

The look-up table 210 may possess a 2-dimensional structure, i.e. mapping a single table entry value to a single corresponding math function result in some embodiments as mentioned above. However, the skilled person will appreciate that certain types of predetermined mathematical functions may require two or more input operands to be mapped to a single corresponding math function result. For example for division operations where the dividend or numerator may be the first input operand and the divisor or denominator the second input operand. This type of look-up table can be considered a 3-dimensional table wherein each pair of input operands is mapped to a single corresponding math function result in accordance with the division operation.

The numerical values held in the look-up table 210 may be stored in different types of memory elements depending on the application and memory options available in the semiconductor process used for integration of the datapath circuit 100. In one embodiment, the look-up table 210 may be designed or fabricated in direct (mask) or synthesizable ROM storing the plurality of table entry values and the plurality of corresponding math function result. Implementation of the look-up table in ROM generally uses a minimum of semiconductor die area and leads to a low power consumption in connection with table-read operations. On the other hand, the mathematical function mapped by the look-up table 210 must be selected at the design time of the of the datapath circuit 100 and remains fixed thereafter which limits flexibility.

In an alternative and likewise advantageous embodiment, the look-up table 210 is stored in a readable and writable memory type such as RAM, EPROM, or EEPROM, flash memory, registers etc. storing the plurality of table entry values and the plurality of corresponding math function result. This embodiment allows the predetermined mathematical function to be changed at run-time in connection with the generation of the executable program instructions or code for the DSP device including the present datapath circuit 100. The predetermined mathematical function may accordingly be selected in a suitable programming tool depending on the nature of the programmed DSP algorithm(s). Hence, for DSP algorithms that include a large number of logarithmic function computations, the look-up table may be configured to map the relevant logarithmic function such as $\ln(x)$, $\log_{10}(x)$, $\log_2(x)$ etc. The look-up table of the same datapath circuit may however be reconfigured to map a completely different predetermined mathematical function, such as one of the above discussed square root or division functions, when executing other types of DSP algorithms. By utilizing the readable and writable memory type for storage of the look-up table, the digital hardware calculator 104 is transformed to a highly flexible math computational engine or co-processor. This property allows the same datapath circuit 104 to speed-up math computation in numerous different DSP algorithms by simply adapting the content of the look-up table. The table entry values and accompanying math function result may be selected or defined in connection with the development of the DSP source code in an appropriate software tool or environment. The software tool may for example be adapted to compute appropriate table values based on user specifications such as table size, minimum and maximum table entry values, binary number format etc. The table entry values and the accompanying math function results may be down-loaded to a non-volatile data memory space accessible to the DSP circuit for storage. At the initialization, or power-on, of the DSP circuit, the table entry values and the accompanying math function results may be read into or transferred to a volatile data memory area like RAM area or register files holding the data content of the look-up table 104 during execution of the DSP algorithm(s) to allow fast access to the table content. The digital hardware calculator 104 depicted in FIG. 2 comprises an interpolator 212 that conveniently may be applied to fill gaps in the table entries of the look-up table 210 or generally improve the accuracy of the math function result if the value of the input operand or compressed input operand fails to exactly match any table entry value. The interpolator 212 is configured for reading or receiving first and second math function results from the look-up table 210. The first and second math function results preferably correspond to the closest math function results above and below the value of the input operand. The interpolator 212 is configured to applying an interpolating operation or function to the first and second math function results to generate an interpolated math function result. The skilled person will understand that different types of interpolation operations or schemes may be applied such as spline interpolation or polynomial interpolation including linear interpolation (which is a special case of polynomial interpolation). Likewise, the interpolation function may exploit additional math function results to the above-mentioned first and second math function results depending on the complexity of the predetermined mathematical function and accuracy requirements of any particular application. For multidimensional lookup tables, the interpolator could be a bilinear (N=3) or tri-linear (N=4) interpolator. For each extra dimension of the look-up table the interpolator requires two additional math function results as inputs such that the bilinear interpolator utilizes four math function results and the tri-linear look-up table requires six math function results from the look-up table.

The math function result generated by the interpolation operation is transmitted to a first input of a settable output limiter 214. The settable output limiter 214 is configured to handle out of bounds conditions of the interpolated math function result for example by truncating the result to a predefined allowable numerical range of the math function result. As illustrated by data bus or wire 205, the settable output limiter 214 may also be adapted to accept a second input directly from the output of MUX 2 to determine whether, upper and/or lower bounds of the look-up table 210 have been exceed. In addition, the settable output limiter 214 may be configured to determine how the upper and/or lower bounds have been exceeded. This information may be applied to determine how the output should be limited in an optimum manner.

The limited and/or interpolated math function result is finally temporarily stored in the output register 216. The output register is preferably coupled to the input of the multiplexer 108 in the MAC structure depicted on FIG. 1 such that stored math function results can be injected directly in the MAC structure. Hence, the digital hardware calculator 104 may be utilized to calculate a computationally hard mathematical function of the first and/or second input operand simultaneously with the digital multiplier 106 computes a product of the same input operands or different input operands for that matter. In this manner, math computations of a DSP algorithm may be split in different portions or segments that are parellelly executed on the specific computational hardware resource of the datapath circuit, i.e. either the digital hardware calculator 104 or the MAC structure, which is optimal for the specific type of mathematical function in question. In this manner, traditional multiply-accumulate operations for FIR-filter computations etc. may be computed on the MAC structure while functions like the previously discussed logarithms, exponents, square roots etc. may be computed on the digital hardware calculator 104. This split of the DSP algorithm between the MAC structure and the digital hardware calculator 104 can lead to considerable power savings and faster execution of DSP algorithm that uses a mix of traditional multiply-accumulate computations and the above-discussed computationally hard mathematical functions. The split between the different types of mathematical operations for a specific DSP algorithm can for example be performed by a suitably configured compiler tool during generation of the executable code that implements the DSP algorithm in question. The compiler tool or environment could be configured to direct one or more computationally hard mathematical function(s) to the digital hardware calculator 104. The decision of which computationally hard mathematical function(s) to direct to the digital hardware calculator 104 could be carried out in numerous ways. In one situation, this decision making could be based on user intervention. In other situations, the decision could be based on an internal priority table of computationally hard mathematical functions. In yet another embodiment, functional simulation of the DSP algorithm on the DSP circuit may be applied to determine which mathematical function or functions consume the largest number of computational cycles on the DSP circuit.

The invention claimed is:

1. A processing system, comprising:
an input data register to store input operand data;
a digital multiply and accumulate (MAC) system and a calculator system each having inputs coupled to the input data register, wherein:
the MAC system comprises a multiplier stage and an adder stage; and
the calculator system comprises a look-up table operatively coupled to the input data register, the look-up table having a plurality of entries mapped to by candidate input operand data, the entries storing corresponding pre-calculated results of a predetermined mathematical function performed on the candidate input operand data and the look-up table having an output connected to an input of the adder stage, the output configured to provide a result of the predetermined mathematical function from a table entry;
wherein the look-up table comprises a readable and writable memory storing the plurality of entries and the corresponding pre-calculated results, the readable and writeable memory supporting run-time changes to the predetermined mathematical function.

2. The system of claim 1, wherein:
the look-up table has fewer entries than are possible under all variations of input operand data;
the look-up table has a pair of outputs to output a pair of table entries that map most closely to an input operand when the input operand does not map to any entry of the look-up table exactly; and
the calculator system further comprises an interpolator coupled to the outputs of the look-up table.

3. The system of claim 1, wherein the look-up table comprises N-dimensions mapping respective N−1 pluralities of entries to corresponding pre-calculated results of the predetermined mathematical operation, wherein N is a positive integer larger than 2.

4. The system of claim 1, wherein
a first input operand comprises an N-bit multiplicand and a second input operand comprises an M-bit multiplier;
the MAC system being adapted to select respective partial products of the N-bit multiplicand, where each partial product is selected from a set of partial product results computed from the N-bit multiplicand in dependence of a predetermined set of bits of the M-bit multiplier in accordance with a predetermined coding scheme;
each of M and N representing a positive integer number.

5. The system of claim 1, wherein the calculator system further comprises a second look-up table operatively coupled between an output of the first look-up table and a calculator output register, the second look-up table comprising a plurality of entries mapped to a plurality of corresponding pre-calculated results in accordance with a second predetermined mathematical function.

6. The system of claim 4, wherein the predetermined coding scheme comprises a Booth coding scheme selected from a group of {radix-8, radix-16, radix-32, radix-64, radix-128}Booth coding.

7. The system of claim 1, further comprising a multiplexer having a pair of inputs, one coupled to the input data register and the other coupled to an output of the calculator system, and an output coupled to an input of the adder stage.

8. The system of claim 1, wherein computational cycles executed by the MAC system at least partly overlap in time with computational cycles executed by the calculator system.

9. The system of claim 1, further comprising:
a data compressor having an input coupled to the input data register, the data compressor configured to map a numerical range of the input operand data into a smaller numerical range of the input operand data; and
a compression multiplexer having inputs operatively coupled to the input data register and the data compressor, the compression multiplexer configured to selectively transmit, to an input of the look-up table, input operand data and corresponding compressed values of the input operand data.

10. The system of claim 1, wherein the multiplier stage and the adder stage are configured in a cascade arrangement.

11. The system of claim 1, wherein the predetermined mathematical function includes at least one function selected from the list including a logarithm function, an exponent function, a division function, and a square root function.

12. The system of claim 1, wherein digital multiply and accumulate (MAC) system and a calculator system are configured for parallel computation.

13. A method of performing a mathematical calculation involving first and second predetermined mathematical functions, the first mathematical function being a multi-bit multiplication, comprising:
wherein the multi-bit multiplication is performed by a multiply and accumulate (MAC) system and the second predetermined mathematical function is performed by a separate calculator system;
wherein the processing includes, in the calculator system:
inputting at least one operand of the second predetermined mathematical function to a look-up table that stores pre-calculated results of the second predetermined mathematical function mapped to a plurality of candidate input operands, wherein pre-calculated results represent values of the second predetermined mathematical function performed on the candidate input operands, and
outputting from the look-up table a result of the second predetermined mathematical function from a table entry mapped to by the at least one inputted operand; and
adding the result output from the look-up table to a value obtained by the MAC system based on the multi-bit multiplication; and
wherein the pre-calculated results of the second predetermined mathematical function are stored in a readable and writable memory, the readable and writable memory configured to support run-time changes to the second predetermined mathematical function.

14. The method of claim 13, wherein, when the inputted operand does not map to any entry of the look-up table exactly, the outputting includes outputting from the look-up table a pair of results related to candidate input operands closest to the inputted operand,
the method further comprising interpolating a result for the second predetermined mathematical function at the inputted operand from the outputted pair of results.

15. The method of claim 13, further comprising, when the result outputted from the look-up table exceeds a predetermined limit of result data, setting the result data to a value associated with the predetermined limit.

16. The method of claim 13, wherein the second predetermined mathematical function includes at least one function selected from the list including a logarithm function, an exponent function, a division function, and a square root function.

17. The method of claim 13, wherein the look-up table has fewer entries than are possible under all variations of input operand data; and
wherein the method comprises interpolating between entries from the look-up table to provide the result of the second predetermined mathematical function.

18. The method of claim 17, wherein the look-up table comprises N-dimensions mapping respective N−1 pluralities of entries to corresponding pre-calculated results of the second predetermined mathematical operation, wherein N is a positive integer larger than 2.

19. The method of claim 17, wherein the calculator system further comprises a second look-up table operatively coupled between an output of the first look-up table and a calculator output register, the second look-up table comprising a plurality of entries mapped to a plurality of corresponding pre-calculated results in accordance with a third predetermined mathematical function.

20. The method of claim 17, wherein computational cycles executed by the MAC system at least partly overlap in time with computational cycles executed by the calculator system.

* * * * *

UNITED STATES PATENT AND TRADEMARK OFFICE
CERTIFICATE OF CORRECTION

PATENT NO. : 9,753,695 B2  
APPLICATION NO. : 14/010946  
DATED : September 5, 2017  
INVENTOR(S) : Mortensen et al.

Page 1 of 1

It is certified that error appears in the above-identified patent and that said Letters Patent is hereby corrected as shown below:

On the Title Page

Item (72), in "Inventors", in Column 1, Line 1, delete "Mikael M. Mortensen," and insert --Mikael Mortensen,-- therefor In the Claims In Column 14, Line 24, in Claim 4, after "wherein", insert --:--

In Column 14, Line 43, in Claim 6, delete "{radix-8," and insert --{radix-4, radix-8,-- therefor In Column 14, Line 44, in Claim 6, delete "radix-128}Booth" and insert --radix-128} Booth-- therefor In Column 15, Line 8, in Claim 13, delete "multi -bit" and insert --multi-bit-- therefor Signed and Sealed this  
Fourteenth Day of April, 2020

Andrei Iancu  
*Director of the United States Patent and Trademark Office*